(12) United States Patent
Gettig et al.

(10) Patent No.: US 10,344,993 B2
(45) Date of Patent: Jul. 9, 2019

(54) EXTRACTOR FAN WITH WEAR INDICATOR

(71) Applicant: Deere & Company, Moline, IL (US)

(72) Inventors: Blake C. Gettig, Thibodaux, LA (US); Jason R. Dehnke, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/636,843

(22) Filed: Jun. 29, 2017

(65) Prior Publication Data

US 2019/0003731 A1    Jan. 3, 2019

(51) Int. Cl.
| A01D 45/10 | (2006.01) |
| F24F 7/06 | (2006.01) |
| A01D 46/20 | (2006.01) |
| A01D 93/00 | (2009.01) |

(52) U.S. Cl.
CPC ............... *F24F 7/06* (2013.01); *A01D 45/10* (2013.01); *A01D 46/20* (2013.01); *A01D 93/00* (2013.01)

(58) Field of Classification Search
CPC ........ A01D 45/10; A01D 46/20; A01D 93/00; E02F 3/815; E02F 9/267; E02F 9/2883; E02F 9/2808; F24F 7/06; G07C 5/006; G07C 5/0808
USPC ................. 56/228, 229; 460/70, 79, 97, 98
See application file for complete search history.

(56) References Cited

U.S. PATENT DOCUMENTS

| 5,348,515 | A * | 9/1994 | Miller ................... B62D 55/12 474/152 |
| 5,746,891 | A * | 5/1998 | Withers .................... D21F 3/10 162/369 |
| 6,041,529 | A * | 3/2000 | Ruvang ................. E02F 9/2816 172/445.1 |
| 6,129,297 | A * | 10/2000 | Sawant ................... B02C 2/005 241/101.3 |
| 6,247,418 | B1 * | 6/2001 | Dunham ................ A01C 7/046 111/179 |
| 6,283,557 | B1 | 9/2001 | Okajima et al. |
| 6,869,356 | B2 | 3/2005 | Hinds |
| 7,008,310 | B2 * | 3/2006 | Andres ..................... B24B 7/17 451/262 |
| 7,670,123 | B2 * | 3/2010 | Cuny ..................... B60C 11/24 425/169 |
| 10,024,033 | B2 * | 7/2018 | Bewley ................... E02F 9/267 |
| 2011/0162241 | A1 | 7/2011 | Wangsness |
| 2012/0049610 | A1 | 3/2012 | Lew |
| 2014/0295923 | A1 * | 10/2014 | Vergote ................. A01D 45/10 460/98 |

OTHER PUBLICATIONS

Image of Tire With Wear Indicators (Sep. 9, 2010) (1 page).
(Continued)

*Primary Examiner* — Robert E Pezzuto
(74) *Attorney, Agent, or Firm* — Taft Stettinius & Hollister LLP; Stephen F. Rost

(57) ABSTRACT

An extractor fan for use in a sugarcane harvester is configured to generate a flow of air to separate debris from sugarcane billets produced by the sugarcane harvester. The extractor fan comprises an extractor fan blade configured to contribute to generation of the flow of air. The extractor fan blade comprises a wear indicator configured to indicate wear of the extractor fan blade.

11 Claims, 4 Drawing Sheets

(56) References Cited

OTHER PUBLICATIONS

Image of K1200GT Rear Brake Pad (Feb. 13, 2015) (1 page).
Article entitled "How can I check and reduce rim wear?" (2015 or earlier) (10 pages).
Image of Worn and Broken Bicycle Rim from Article entitled "How can I check and reduce rim wear?" (2015 or earlier) (1 page).

* cited by examiner

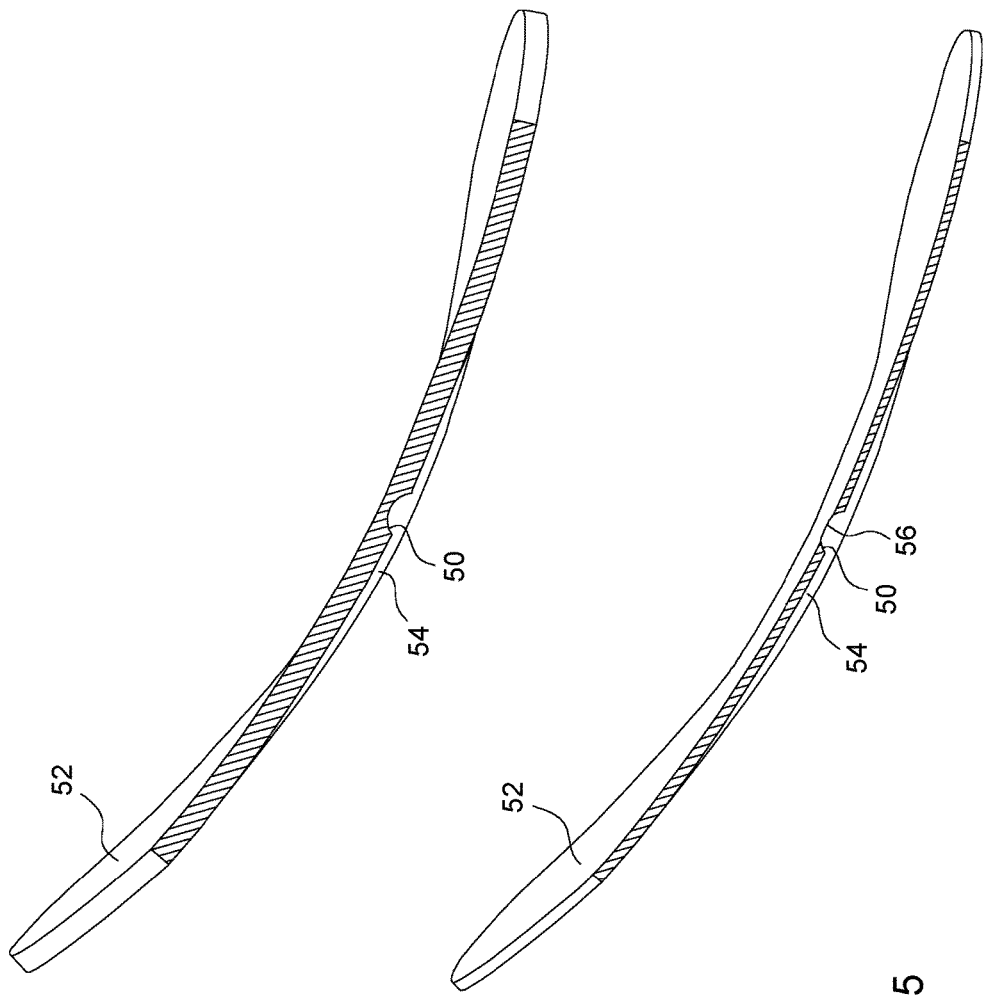

EXTRACTOR FAN WITH WEAR INDICATOR

FIELD OF THE DISCLOSURE

The present disclosure relates to an extractor fan for use in a sugarcane harvester.

BACKGROUND OF THE DISCLOSURE

Sugarcane harvesters typically have at least one extractor for separating debris from sugarcane billets produced by the sugarcane harvester. For example, many sugarcane harvesters have a primary extractor positioned just downstream from a chopping section of the sugarcane harvester, and configured to separate debris, including, for example, crop residue (e.g., leafy material), from the billets and remove the debris from the harvester. In some embodiments, sugarcane harvesters also have a secondary extractor positioned near the top of the elevator, and configured to further separate debris from the billets and remove the debris from the harvester.

SUMMARY OF THE DISCLOSURE

According to an aspect of the present disclosure, an extractor fan for use in a sugarcane harvester is configured to generate a flow of air to separate debris from sugarcane billets produced by the sugarcane harvester. The extractor fan comprises an extractor fan blade configured to contribute to generation of the flow of air. The extractor fan blade comprises a wear indicator configured to indicate wear of the extractor fan blade.

In some embodiments, the extractor fan blade may comprise a first surface facing downstream relative to the flow of air and an opposite second surface facing upstream relative to the flow of air. The second surface may comprise the wear indicator to indicate wear of the first surface. The wear indicator may be a visual wear indicator, which may comprise a recessed portion.

The above and other features will become apparent from the following description and accompanying drawings.

BRIEF DESCRIPTION OF THE DRAWINGS

The detailed description of the drawings refers to the accompanying figures in which:

FIG. 4 is a sectional view, taken along lines 4-4 of FIG. 3, showing an embodiment of a wear indicator; and FIG. 5 is a sectional view, similar to FIG. 4, showing a wear indication by the wear indicator.

DETAILED DESCRIPTION OF THE DRAWINGS

Figure 1:
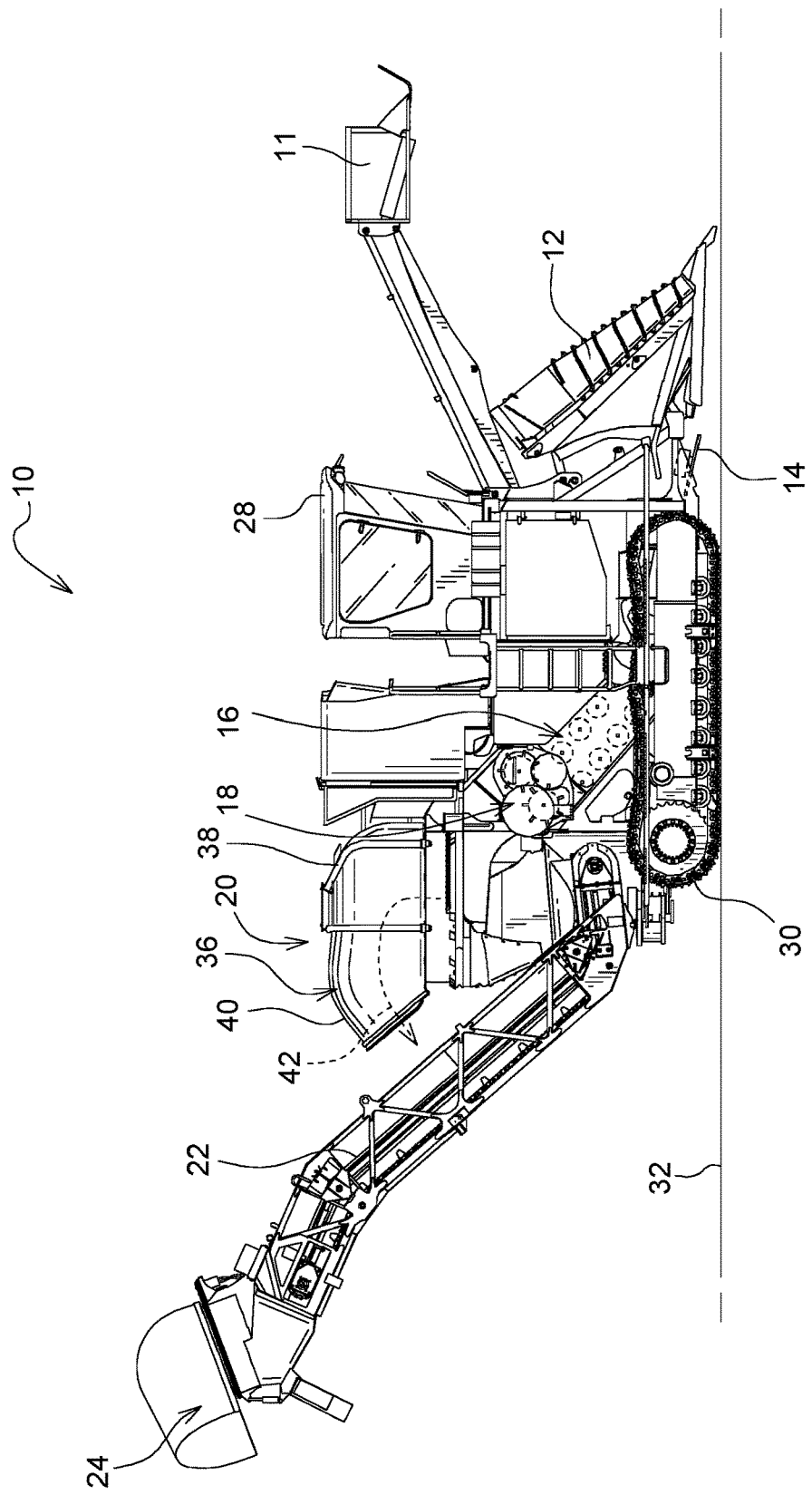
FIG. 1 is a side elevational view showing a sugarcane harvester with a primary extractor and, in some embodiments, a secondary extractor.

Referring to FIG. 1, a sugarcane harvester 10 is configured to harvest sugarcane. Illustratively, the harvester 10 comprises a topper 11, a left crop divider scroll 12 and a right crop divider scroll 12 (the left crop divider scroll 12 not shown), an upper knockdown roller and a lower knockdown roller (the knockdown rollers not shown), a basecutter 14, a feed section 16, a chopping section 18, a primary extractor 20, an elevator 22, and a secondary extractor 24. The topper 11 is configured to cut off the leafy top portion of sugarcane plants so as not to be ingested into the harvester 10. The left and right crop divider scrolls 12 are configured to lift the sugarcane for feeding into the throat of the harvester 10.

The basecutter 14 comprises a left cutting disk and a right cutting disk (the left cutting disk not shown). The left and right cutting disks cooperate with one another to sever the stalk of sugarcane knocked down by the knockdown rollers at a location near the ground. The feed section 16 is configured to receive from the basecutter 14 a mat of severed sugarcane and to feed the mat rearwardly. The chopping section 18 is configured to receive the mat from the feed section 16 and cut the sugarcane stalk into billets. The primary extractor 20 is positioned downstream from the chopping section 18 and is configured to separate debris, including, for example, crop residue (e.g., leafy material), from the billets and remove the debris from the harvester 10.

The elevator 22 is positioned at the rear of the harvester 10 to receive the cleaned flow of billets, and is configured to convey the billets to an elevated position where they are discharged into a wagon to be hauled away. The secondary extractor 24 (some embodiments may not have a secondary extractor) is positioned near the top of the elevator 22, and is configured to further separate debris from the billets and remove the debris from the harvester 10.

The harvester 10 comprises an operator's station 28 and traction elements 30. A human operator may operate the harvester 10 from the operator's station 30. The traction elements 30 are positioned on the left and right sides of the harvester 10 for propelling the harvester 10 along the ground. Each traction element 30 may be, for example, a track unit or a ground-engaging wheel (e.g., there is one track unit on each side of the harvester 10 as shown, for example, with respect to the right side in FIG. 1).

Figure 2:
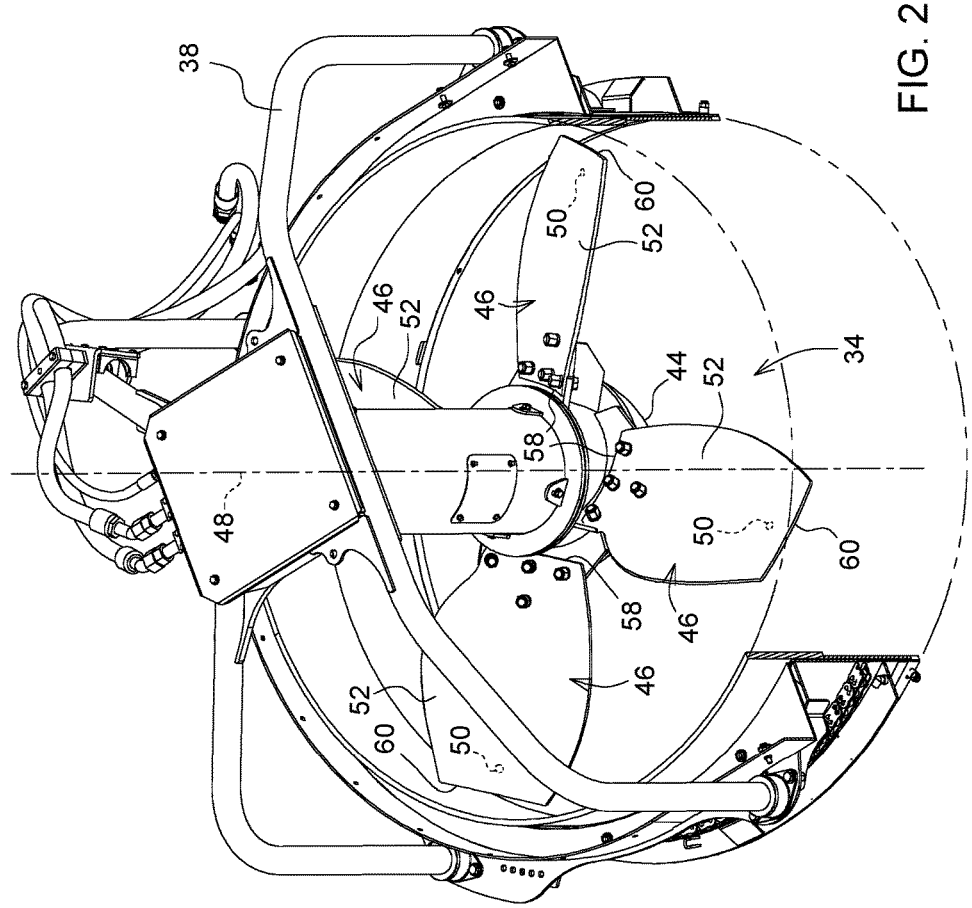
FIG. 2 is a perspective view, with portions broken away, showing the primary extractor with an extractor fan.
Figure 3:
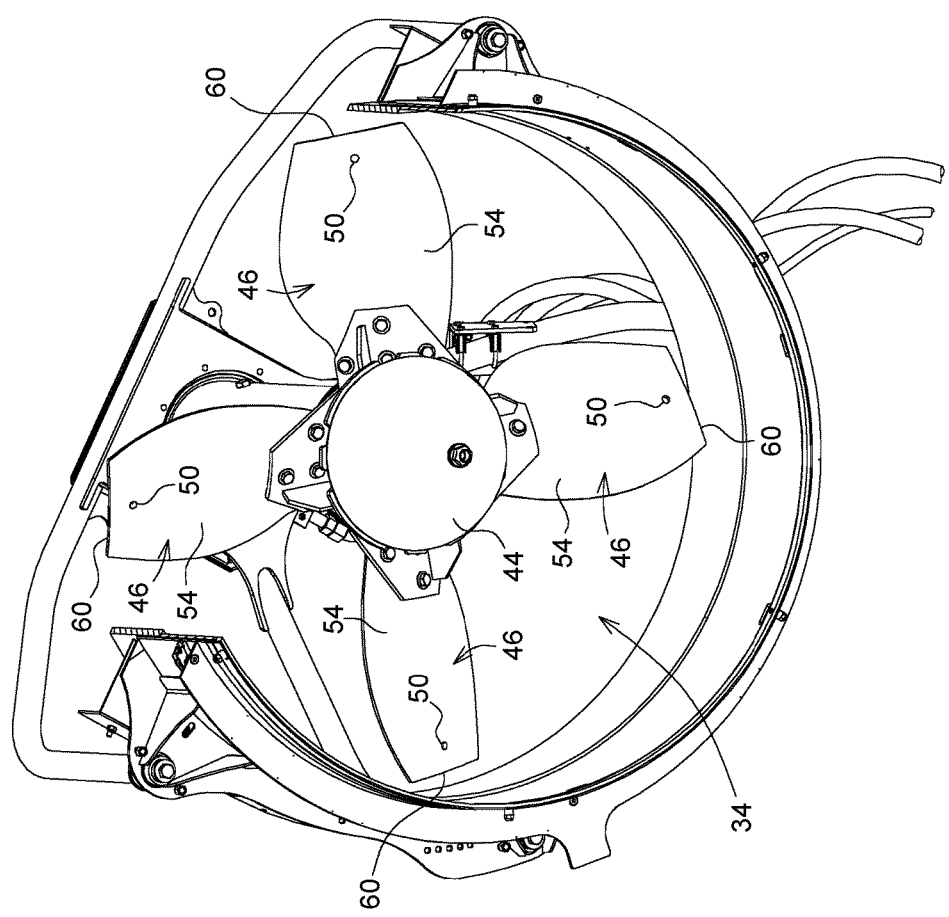
FIG. 3 is a perspective view, with portions broken away, showing the extractor fan with a number of extractor fan blades one or more of which comprises a wear indicator configured to indicate wear of the extractor fan blade.

Referring to FIGS. 2 and 3, the primary extractor 20 comprises an extractor fan 34 and an extractor body 36 to which the extractor fan 34 is mounted. The extractor body 36 comprises a frame 38 and a hood 40 mounted to the frame 38. In the illustrated embodiment, the extractor fan 34 is suspended from the frame 38.

It is to be understood that an extractor fan (whether part of the primary or secondary extractor) may be mounted in a variety of ways. For example, in the secondary extractor 24, the extractor fan is mounted from the side of the frame of the secondary extractor.

The primary extractor 20 may be mounted to a frame of the harvester 10 for rotation relative thereto to direct debris in a desired direction. The harvester 10 may comprises a rotator (e.g., a motor-and-chain drive) to so rotate the extractor 20. The secondary extractor 20 may be similarly rotatable.

Referring to FIGS. 3 and 4, the extractor fan 34 is configured to generate a flow of air 42 to separate debris from sugarcane billets (the flow of air 42 shown diagrammatically in FIG. 1). The fan 34 comprises a hub 44 and a plurality of extractor fan blades 46 mounted to, and spaced generally evenly about, the hub 44 for rotation therewith about an axis of rotation 48 of the extractor fan 34. Each of the fan blades 46 is configured to contribute to generation of the flow of air 42. The fan blades 46 may be removably mounted to the hub 44 (e.g., via fasteners).

The extractor fan blades 46 can wear over time as they contact debris during use. Each extractor fan blade 46 comprises a wear indicator 50 configured to indicate wear of that fan blade 46. The fan blade 46 comprises a first surface 52 and an opposite second surface 54. The first surface 52 faces downstream relative to the flow of air 42, and the second surface 54 faces upstream relative to the flow of air 42. Illustratively, the second surface 54 comprises the wear indicator 50, which is configured to indicate wear of the first surface 52.

Referring to FIGS. 4 and 5, the wear indicator 50 may be configured in a variety of ways. Illustratively, the wear indicator 50 is a visual wear indicator formed in the second surface 54 of the fan blade 46. In such a case, the wear indicator 50 may comprise one or more dimples, score lines, impressions, or other configurations, or combinations thereof, in the second surface 54.

The wear indicator 50 is depicted, for example, as a dimple in FIGS. 4 and 5. In such a case, the wear indicator 50 is configured to provide a through-hole 56 in the fan blade 46 upon wear of the first surface 52, allowing, for example, a person standing next to the harvester 10 to perform a ground-level wear inspection. Daylight visible through the wear indicator 50 due to the presence of a through-hole 56 evidences that the fan blade 46 is worn and ready for replacement. The wear indicator 50 may operate in a similar fashion when configured in other ways.

The wear indicator 50 may be positioned on the fan blade 46 in an area of relatively high wear. Illustratively, the fan blade 46 comprises, relative to an axis of rotation 48 of the extractor fan 34, a radially inner edge 58 and a radially outer edge 60. The wear indicator 50 is closer, for example, to the radially outer edge 60 than the radially inner edge 58.

While the present disclosure has been illustrated and described in detail in the drawings and foregoing description, such illustration and description is to be considered as not restrictive in character. It is to be understood that all changes and modifications that come within the spirit of the present disclosure are desired to be protected. It will be noted that alternative embodiments of the present disclosure may not include all of the features shown and described. Those of ordinary skill in the art may readily devise their own implementations that incorporate one or more of the features of the present disclosure and fall within the spirit and scope of the appended claims.

What is claimed is:

1. A sugarcane harvester comprising an extractor, the extractor comprising an extractor fan configured to generate a flow of air to separate debris from sugarcane billets produced by the sugarcane harvester, the extractor fan comprising an extractor fan blade configured to contribute to generation of the flow of air, the extractor fan blade comprising an upper wear surface and a lower surface opposite the upper wear surface, the fan blade including a first configuration and second configuration, wherein the first configuration includes a wear indicator recess formed at a location at the lower surface, and the second configuration includes a through-hole extending through both the lower surface and the upper wear surface at the location of the wear indicator recess, wherein the through-hole indicates that the fan blade is worn and ready for replacement.

2. The sugarcane harvester of claim 1, wherein the upper wear surface faces downstream relative to the flow of air.

3. The sugarcane harvester of claim 2, wherein the lower surface faces upstream relative to the flow of air.

4. The sugarcane harvester of claim 1, wherein the wear indicator recess comprises a dimple.

5. The sugarcane harvester of claim 4, wherein the extractor fan blade comprises relative to an axis of rotation of the extractor fan a radially inner edge and a radially outer edge, and the dimple is closer to the radially outer edge than the radially inner edge.

6. The sugarcane harvester of claim 4, wherein the dimple is configured to provide the through-hole in the extractor fan blade upon wear of the upper wear surface.

7. The sugarcane harvester of claim 1, wherein the extractor comprises a primary extractor including an extractor body having a hood and a frame to which the extractor fan is mounted, wherein the wear indicator recess and the through hole are visible through the hood by a person standing next to the harvester.

8. The sugarcane harvester of claim 7, wherein the wear indicator recess is located on the fan blade in an area of relatively high wear.

9. The sugarcane harvester of claim 8, wherein the fan blade includes a radially inner edge and a radially outer edge with respect to an axis of rotation, wherein the wear indicator recess is closer to the radially outer edge than to the radially inner edge.

10. The sugarcane harvester of claim 7, wherein the extractor fan includes a hub, wherein a first end of the extractor fan blade is removably mounted to the hub and a second end of the extractor blade is spaced from the first end.

11. The sugarcane harvester of claim 10, wherein the wear indicator recess is located closer to the second end than to the first end.

* * * * *